United States Patent
Estrada et al.

(10) Patent No.: US 12,417,532 B2
(45) Date of Patent: Sep. 16, 2025

(54) SYSTEMS, APPARATUSES, AND METHODS FOR DETECTING EARLY DROUGHT STRESS IN PLANTS

(71) Applicants: John Benedict Allasas Estrada, Fresno, CA (US); Pauline Victoria Allasas Estrada, Fresno, CA (US)

(72) Inventors: John Benedict Allasas Estrada, Fresno, CA (US); Pauline Victoria Allasas Estrada, Fresno, CA (US)

( * ) Notice: Subject to any disclaimer, the term of this patent is extended or adjusted under 35 U.S.C. 154(b) by 121 days.

(21) Appl. No.: 18/313,780

(22) Filed: May 8, 2023

(65) Prior Publication Data
US 2023/0360211 A1    Nov. 9, 2023

Related U.S. Application Data

(60) Provisional application No. 63/339,420, filed on May 7, 2022, provisional application No. 63/339,422, filed
(Continued)

(51) Int. Cl.
*G06T 7/00* (2017.01)
*H04N 7/18* (2006.01)

(52) U.S. Cl.
CPC .......... *G06T 7/0012* (2013.01); *H04N 7/181* (2013.01); *G06T 2207/10024* (2013.01);
(Continued)

(58) Field of Classification Search
CPC ......... G06T 7/0012; G06T 2207/10024; G06T 2207/10048; G06T 2207/20081;
(Continued)

(56) References Cited

U.S. PATENT DOCUMENTS 9,866,768 B1 *  1/2018  O'Shaughnessy ..... H04N 23/11
11,263,707 B2 *  3/2022  Perry ................... A01B 79/005
(Continued)

OTHER PUBLICATIONS

Abdelrahman et al., "The "Stay-Green" trait and phytohormone signaling networks in plants under heat stress", published May 8, 2017.
(Continued)

*Primary Examiner* — Thai Q Tran
*Assistant Examiner* — Stephen R Smith
(74) *Attorney, Agent, or Firm* — Marcus N. DiBuduo; John R. Aaron

(57) ABSTRACT

A remote inspection vehicle for inspecting a plant for early drought stress and a neural network model for calculating a score corresponding to a level of early drought stress in the plant. The inspection vehicle may be equipped with an inspection camera having a radiometric infrared sensor and a red, green, and blue light sensor to capture plant images. Image data from the inspection vehicle, as well as soil moisture and calculated CWSI scores, can be used to train the neural network model, deriving weights and biases therefrom using a plurality of neural network layers. Using a plant canopy temperature value, a red raster value, a green raster value, a blue raster value, and a soil moisture value, the trained neural network model can generate a score which can be used to assess the level of early drought stress in a plant.

19 Claims, 6 Drawing Sheets

Related U.S. Application Data on May 7, 2022, provisional application No. 63/339,421, filed on May 7, 2022, provisional application No. 63/339,418, filed on May 7, 2022.

(52) U.S. Cl.
CPC .............. *G06T 2207/10048* (2013.01); *G06T 2207/20081* (2013.01); *G06T 2207/20084* (2013.01); *G06T 2207/30188* (2013.01)

(58) Field of Classification Search
CPC . G06T 2207/20084; G06T 2207/30188; G06T 7/0004; H04N 7/181
USPC .............................................. 348/125; 702/2
See application file for complete search history.

(56) References Cited

U.S. PATENT DOCUMENTS

| | | | | |
|---|---|---|---|---|
| 2020/0333185 | A1* | 10/2020 | Vrabie | G06N 3/08 |
| 2021/0398281 | A1* | 12/2021 | Lys | H04N 23/80 |
| 2023/0026679 | A1* | 1/2023 | Matarazzo | B64C 39/024 |
| 2023/0292647 | A1* | 9/2023 | Bainbridge | G06T 7/0016 702/2 |
| 2023/0316555 | A1* | 10/2023 | Spangenberg | G06V 10/82 345/419 |
| 2024/0095911 | A1* | 3/2024 | Taneja | G06V 20/188 |

OTHER PUBLICATIONS

Barry et al., "Amino Acid Substitutions in Homologs of the Stay-Green Protein are Responsible for the green-flesh and chlorophyll retainer Mutations of Tomato and Pepper", published Mar. 21, 2008.
An et al., "Identification and Classification of Maize Drought Stress Using Deep Convolutional Neural Network", published Feb. 18, 2019.
Andrade et al., "Machine learning algorithms applied to the forecasting of crop water stress indicators", published 2018.
Singh et al., "Machine Learning for High-Throughput Stress Phenotyping in Plants", published Feb. 2016.
Barry et al., "A survey of cultivated heirloom tomato varieties identifies four new mutant alleles at the green-flesh locus", published May 18, 2009.
Talbott et al., "Phytochrome and Blue Light-Mediated Stomatal Opening in the Orchid, Paphiopedilum", published 2002.
Buitrago et al., "Changes in thermal infrared spectra of plants caused by temperature and water stress", published Dec. 8, 2015.
Chattopadhyay et al., "Skin colour, carotenogenesis and chlorophyll degradation mutant alleles: genetic orchestration behind the fruit colour variation in tomato", published Jan. 3, 2021.
Corrigan, "10 Thermal Vision Cameras for Drones and How Thermal Imaging Works", believed to be published Feb. 27, 2020, retrieved Jul. 18, 2023 from https://www.dronezon.com/learn-about-drones-quadcopters/9-heat-vision-cameras-for-drones-and-how-thermal-imaging-works/.
Alordzinu et al., "Rapid Estimation of CropWater Stress Index on Tomato Growth", published Jul. 29, 2021.
Stutsel et al., "Detecting Plant Stress Using Thermal and Optical Imagery From an Unoccupied Aerial Vehicle", published Oct. 25, 2021.
Colak et al., "Evaluation of Crop Water Stress Index (CWSI) for Eggplant under Varying Irrigation Regimes Using Surface and Subsurface Drip Systems", published Apr. 27, 2015.
Hortensteiner, "Stay-green regulates chlorophyll and chlorophyll-binding protein degradation during senescence", published Feb. 23, 2009.
Thomas et al., "The stay-green trait", published Mar. 5, 2014.
Hu et al., "Silencing of the LeSGR1 gene in tomato inhibits chlorophyll degradation and exhibits a stay-green phenotype", published 2011.
Idso, "Non-Water-Stressed Baselines: A Key to Measuring and Interpreting Plant Water Stress", published 1982.
Inoue et al., "Blue Light Regulation of Stomatal Opening and the Plasma Membrane H+-ATPase1[Open]", published Jun. 2017.
Jackson et al., "Canopy Temperature as a Crop Water Stress Indicator", published Aug. 1981.
Mott et al., "The role of the mesophyll in stomatal responses to light and CO2", published 2008.
Nay et al., "A machine-learning approach to forecasting remotely sensed vegetation health", published Dec. 18, 2017.
Condorelli et al., "Comparative Aerial and Ground Based High Throughput Phenotyping for the Genetic Dissection of NDVI as a Proxy for Drought Adaptive Traits in Durum Wheat", published Jun. 26, 2018.
Erken et al., "Effects of Water Stress on Yield and Some Quality Parameters of Broccoli", published Jun. 2010.
Dayer et al., "Nighttime transpiration represents a negligible part of water loss and does not increase the risk of water stress in grapevine", published 2021.
Jackson et al., "A Reexamination of the Crop Water Stress Index", published 1988.
Jiao et al., "Roles of stay green (SGR) homologs during chlorophyll degradation in green plants", published Sep. 23, 2020.
Kang et al., "Molecular Insights Reveal Psy1, SGR, and SlMYB12 Genes are Associated with Diverse Fruit Color Pigments in Tomato (*Solanum lycopersicum* L.)", published Dec. 8, 2017.
Shimazaki et al., "Light Regulation of Stomatal Movement", published Jan. 5, 2007.
Eisinger et al., "The Ultraviolet Action Spectrum for Stomatal Opening in Broad Bean", published Jan. 2000.
Ehrler, "Cotton Leaf Temperatures as Related to Soil Water Depletion and Meteorological Factors", published May 1, 1973.
Yang et al., "Assessment of Water and Nitrogen Use Efficiencies Through UAV-Based Multispectral Phenotyping in Winter Wheat", published Jun. 26, 2020.
Yang et al., "Light-Mediated Signaling and Metabolic Changes Coordinate Stomatal Opening and Closure", published Dec. 4, 2020.
Yang et al., "Non-Contacting Techniques for Plant Drought Stress Detection", published 2008.
Luo et al., "A Stay-Green protein SlSGR1 regulates lycopene and β-carotene accumulation by interacting directly with SlPSY1 during ripening processes in tomato", published Apr. 2013.

* cited by examiner

SYSTEMS, APPARATUSES, AND METHODS FOR DETECTING EARLY DROUGHT STRESS IN PLANTS

CROSS-REFERENCE TO RELATED APPLICATIONS

This application claims priority to, and the benefit of, U.S. Provisional Patent Application Nos. 63/339,418, 63/339,420, 63/339,421, and 63/339,422, each filed May 7, 2022, and each of which are hereby incorporated by reference in their entirety.

FIELD OF THE INVENTION

The present invention concerns the inspection of plants for drought stress using a camera to collect image data for processing. The present invention also concerns the development and use of a neural network model for calculating a drought stress score. More particularly, embodiments of the present invention concern a neural network model receiving image data as an input and which can output a score indicating the level of drought stress present in a plant, and a remote inspection vehicle for collecting image data from a plant provided to the neural network model.

BACKGROUND OF THE INVENTION

Drought is a persistent serious threat to the agricultural industry—a threat that will likely grow in severity as the world's climate continues to change. In particular, drought induces stress on plants which impacts crop yields. Early detection of drought stress is paramount, as plants may endure irreversible damage due to drought stress if it is not detected in a timely manner. Some conventional methods exist to monitor plant water, such as the pressure bomb and the leaf diffusion porometer. However, such methods are invasive and don't detect drought stress until the plant is already in a late stage of stress (which poses the risk of irreversible damage). Other conventional methods of detecting drought stress may involve qualitative assessments, such as visual detection. However, such methods are highly subjective and dependent on the level of skill of the inspector performing the evaluation and/or scoring. Furthermore, when signs of stress are visible to the naked eye, the level of stress may already be, at that point, considered excessive and possibly irreversible, which may lead to unavoidable crop yield reduction.

Technological advancements in visible light and thermal (infrared) imaging have led to the development of remotely accessible, non-invasive methods for determining the water status in plants. Thermal imaging cameras can capture thermal energy radiated off of surfaces of most heat-emitting sources. Thermal energy is radiated as infrared (IR) waves, composed of varying wavelengths ranging from short waves to long waves. Relatively warmer surfaces will emit more shortwave radiation, whereas and relatively cooler surfaces will emit more longwave radiation. Thermal imaging cameras can be used for infrared thermography, which is a technique used to capture an infrared image and translate it into radiometric temperature measurements/values. This technique can be used to measure the canopy temperature of most plants.

Development of infrared technology for measuring canopy temperature has led to the development of a quantitative method of water stress evaluation. The concept of the crop water stress index (CWSI) utilizes infrared technology to assess drought stress in plants. In particular, a plant that is suffering from drought stress will have a relatively higher canopy temperature compared to a normal and healthy plant. Values of the CWSI range from 0 to 1, where a higher value indicates a higher probability that a plant is experiencing drought stress.

The CWSI calculation uses variables that are mostly indirect indicators of drought stress in the plant, namely, vapor pressure deficit, air temperature, and, in some cases, canopy temperature. As a result, CWSI scores may not provide an accurate indication of whether a plant is experiencing drought stress. Furthermore, CWSI involves the use of complex meteorological variables which can make calculations cumbersome. However, since the number of conventional techniques for assessing the level of drought stress present in plants are limited, the CWSI has long been a popular tool for assessing the level of drought stress for a plant.

One phenomenon that can occur in plants experiencing early drought stress is the "stay green" effect, during which a plant maintains its green color, even though it is under drought stress. This effect makes it difficult to visually determine whether or not a plant is in fact experiencing drought stress. Unfortunately, a CWSI score may sometimes inaccurately indicate that a plant experiencing this phenomenon is not under drought stress, which is another drawback of using the CWSI.

With the emergence and development of artificial intelligence (AI) within the field agriculture, particularly with respect to machine learning algorithms, significant progress has been made in predicting drought stress in plants. One of the most common conventional deep learning methods used is the "transfer learning" method, which requires only a small dataset and less advanced hardware, but requires a predetermined and tested model. However, the use of a "train from scratch" method which utilizes multiple neural networks layers can offer a better way of estimating and predicting drought stress in plants.

There therefore exists the need to assess drought stress in plants using variables which are direct indicators of drought stress. There also exists the need for quantifying the level of drought stress more accurately than that of the CWSI and other conventional means. There further exists the need for accurately quantifying the level of drought stress when a plant is experiencing the "stay green" phenomenon.

BRIEF SUMMARY OF THE INVENTION

According to some embodiments of the present invention, an apparatus is provided for inspecting early drought stress in plants. In preferred implementations, the apparatus may be a remote inspection vehicle which may be configured to visually inspect plants and provide input data to a model to calculate a drought stress assessment score (discussed further hereinafter). In contrast with conventional means of human inspection and/or aerial overview imaging, use of the remote inspection vehicle of the present invention allows for consistent, close proximity plant canopy measurements and real-time data transmission. Utilizing the remote inspection vehicle, farmers can, for example, obtain, view, save, and upload radiometric thermal data, as well as red, green, and blue (RGB) images to a cloud server from the safety of their home or office. The remote inspection vehicle may allow for rapid detection of drought stress either on site or remotely. Other benefits include being able to monitor crop water status at multiple locations without the need for traveling to each site, which can, for example, decrease the risk of transmitting or contracting easily transmissible diseases or pathogens not only for plants but also for farmers. Hazardous exposures by farmers to pesticides and smoke from wildfires may also be minimized through the use of the remote inspection vehicle.

According to some embodiments of the present invention, a remote inspection vehicle may comprise a chassis and a plurality of wheels engaged thereto. In some embodiments, one or more motors may be operatively connected with the wheels for driving each wheel. The remote inspection vehicle may comprise a power supply for powering the electrical components of the vehicle which, in some embodiments, may be a rechargeable or non-rechargeable battery. According to some embodiments, the remote inspection vehicle may be equipped with a GPS receiver for tracking a position of the vehicle.

According to some embodiments, a remote inspection vehicle may be equipped with an inspection camera for inspecting plants and capturing images therefrom. In some embodiments, the inspection camera may comprise a radiometric infrared (IR) sensor and an RGB light sensor. The remote inspection vehicle may also, according to some embodiments, comprise a movement camera which may assist with navigation and steering. In some embodiments, the movement camera may comprise a radiometric IR sensor and an RGB sensor.

According to some embodiments of the present invention, the remote inspection vehicle may comprise a movement controller for controlling forward, rearward, and rotational movement. In some embodiments, the movement controller may allow for autonomous control of the remote inspection vehicle, or it may allow the remote inspection vehicle to be controlled by remotely operated controller operatively connected thereto. In some embodiments, the remotely operated controller and the movement controller may be indirectly operatively connected via a network. According to some embodiments, the movement controller may be equipped with a GPS receiver (or may be otherwise operatively connected thereto) which may allow a global position of the remote inspection vehicle to be tracked remotely. The GPS receiver may also aid with autonomous movement of the remote inspection vehicle.

According to some embodiments of the present invention, the remote inspection vehicle may include a computer which may be operatively connected with the inspection camera, the movement camera system, the movement controller, and, in some embodiments, a network. According to some embodiments, the remote inspection vehicle may have a data transceiver which may be operatively connected with the inspection camera, the movement camera, the flight controller, the computer, and, in some embodiments, a remote computer. In some embodiments, the data transceiver and the remote computer may be indirectly operatively connected via a network.

According to some embodiments, the remote inspection vehicle may be configured to be preprogrammed with route instructions and image capture instructions, thus enabling the remote inspection vehicle to move autonomously along a path and autonomously capture one or more images of a plant canopy. In some embodiments, an operator may manually control the remote inspection vehicle. Utilizing the inspection camera, the remote inspection vehicle may obtain one or more radiometric IR and/or RBG images of a plant canopy from which light reflectance values and canopy temperature values may be extracted. Image data may be processed on the computer of the remote inspection vehicle, or it may be transmitted to a remote computer for processing, with the data being used in a neural network model (discussed hereinafter) to calculate a drought stress assessment score.

According to some embodiments, a neural network model may use variables which are physiologic and direct indicators of drought stress in plants. In preferred embodiments, the model may use radiometric IR values, and red, green, and blue light reflectance values, as well as, optionally, soil moisture readings. In some embodiments, the model may use a plurality of neural network layers to derive the appropriate weights and biases from the variables collected (i.e., IR values, RGB light reflectance values, and soil moisture). To train and develop the model, a collection of data samples, which, in some embodiments, may include calculated CWSI values, may be divided into a training dataset and a validation dataset. Once trained, the model may calculate a drought assessment score using canopy temperature, red, green, and blue raster values, and, in some embodiments, soil moisture, and this score may be used, for example, to decide whether or not to irrigate.

According to some embodiments, a neural network model may comprise a sequential algorithm with, preferably, three neural network layers. In preferred embodiments, the neural network model may be optimized using a stochastic gradient descent method that is based on adaptive estimation of first-order and second-order moments, such as the Adam optimization algorithm, and mean squared error may be used as the loss function. In some embodiments, metrics that may also be used in the model may be the mean squared error and mean absolute error. In some embodiments, an early stopping function may be incorporated to prevent overfitting.

To collect data samples for testing and validation, a soil moisture sensor may be used to measure soil moisture of a plant to be imaged. In some embodiments, the ambient temperature and relative humidity may also be measured using a soil moisture meter, hygrometer, and/or thermometer. Plant canopy temperatures and light reflectance values may be measured by a radiometric IR sensor and an RGB light sensor, respectively, which may be preferably measured using the inspection camera of the remote inspection vehicle of the present invention. In some embodiments, individual pixel temperatures may be extracted from the radiometric thermal images and red, green, and blue raster values may be extracted from the RGB images. In some embodiments, the pixel temperatures of one or more thermal images may be averaged to obtain an average canopy temperature. Similarly, the red, green, and blue raster values may be averaged for each color. In some embodiments, an extracted canopy temperature (or calculated average) may be used to calculate a CWSI score (which may be used in the training of the neural network model).

In preferred embodiments, a captured IR image may have at least 19,200 pixels, and at least 230,400 canopy temperatures may be used to develop the neural network model. Similarly, and in preferred embodiments, each captured RGB image may have at least 19,200 pixels, and at least 230,400 raster values for each red, green, and blue light wavelength may be used to develop the neural network model. Preferably, soil moisture may be measured at the same time that the IR and RGB images are obtained.

To train the neural network model, a data array of canopy temperature values, red, green, and blue raster values, and soil moisture may be input into the model program. In some embodiments, the CWSI value corresponding to each data point may be calculated from an IR image and imported as well. In preferred implementations, about 80% of the total collected data may be used as the training dataset. In some implementations, all data, including the test data, may be normalized. In preferred embodiments, three neural network layers may be used to derive the appropriate weights and biases from the five variables of the training dataset. In some embodiments, an early stopping function may be incorporated into the neural network model to prevent overfitting. After rendering of the neural network model, it may be validated by calculating a drought assessment score on the approximately remaining 20% of the dataset (the validation dataset) to measure the degree of correlation between the CWSI values and the calculated score by the neural network model. In some implementations, a prediction output program may be integrated with the trained model to calculate a drought assessment score using new data from a plant.

According to some embodiments of the present invention, an apparatus for inspecting early drought stress in plants may comprise a) a rechargeable power supply, b) a plurality of electronic motors, wherein each motor may have a wheel which may be engaged to a shaft thereof, c) a motion control circuit which may be electrically engaged to each of the electronic motors, d) a data transceiver, e) an inspection camera which may comprise a first image processor which may be engaged with a first radiometric infrared sensor and a first color light sensor, and which may be configured to generate a plurality of inspection image files therefrom, and f) a movement camera which may comprise a second image processor which may be engaged with at least one of a second infrared sensor and a second color light sensor, and which may be configured to generate a plurality of movement image files therefrom. In some embodiments, the motion control circuit may comprise a processor which may be electrically engaged with the plurality of motors and a memory for storing instructions, wherein the instructions may be adapted to cause the motions control circuit to move the motors. In some embodiments, the motion control circuit may comprise a wireless movement transceiver, wherein the movement transceiver may be adapted to interface with a remote transceiver and receive the instructions. In some embodiments, the motion control circuit may comprise a position determining circuit. In some embodiments, the first color light sensor may comprise an RGB sensor with an infrared filter. In some embodiments, the apparatus may further comprise a main controller, wherein the main controller may comprise a processor and a memory for storing instructions, and wherein the main controller may be electrically engaged to the motion control circuit, the data transceiver, the inspection camera, and the movement camera. In some embodiments, the instructions may be adapted to cause the motion control circuit to move the motors. In some embodiments, the instructions may be adapted to cause the controller to receive and process the inspection image files and the movement image files. In some embodiments, the instructions may be adapted to cause the controller to transmit the inspection image files and the movement image files to a remote memory through the data transceiver.

According to some embodiments of the present invention, a method for determining the probability of early drought stress in a plant may comprise the steps of a) creating a neural network model having at least three layers, b) obtaining a radiometric infrared image file of the plant, c) obtaining each of a red, green, and blue light reflectance image file of the plant, d) providing each of the radiometric infrared image file, the red light reflectance image file, the green light reflectance image file, and the blue light reflectance image file to the model, and e) generating a score associated with the plant. In some embodiments, the step of creating the model may comprise creating a training database, wherein the training database may consist of a plurality of databases of samples, wherein each of the samples may comprise a temperature value, a red raster value, a green raster value, a blue raster value, a moisture value, and a calculated CWSI value. In some embodiments, the temperature value is extracted from a radiometric infrared image. In some embodiments, each of the red raster value, the green raster value, and the blue raster value may be extracted from a light reflectance image. In some embodiments, the CWSI value may be calculated by taking an average of a plurality of the temperature value. In some embodiments, the method may further comprise the step of f) determining a plurality of weights and biases of the neural network model by using about eighty percent (80%) of the samples in the database. In some embodiments, the method may further comprise the step of f) optimizing the model with a loss function of mean squared error, and metrics of mean squared error and mean absolute error. In some embodiments, the method may further comprise the step of f) applying an early stopping function to prevent overfitting. In some embodiments, the method may further comprise the steps of f) obtaining a soil moisture value associated with the plant, and g) providing the soil moisture value to the model.

According to some embodiments of the present invention, a system for determining early drought stress in a plant may comprise a) a processor and a memory, wherein the memory may comprise instructions which may be adapted to generate a drought assessment score associated with the plant from a radiometric infrared image and a red, green, and blue light reflectance image of the plant, and b) a remote inspection vehicle for obtaining the images of the plant, wherein the remote inspection vehicle may comprise a data transceiver and an inspection camera, wherein the inspection camera may comprise a first image processor which may be engaged with a radiometric infrared sensor and a color light sensor, and which may be configured to generate the images therefrom, wherein the instructions may comprise a neural network model having at least three layers, and may be trained and optimized using a database of samples, wherein each sample may comprise a temperature value, a red raster value, a green raster value, a blue raster value, a moisture value, and a calculated CWSI value. In some embodiments, the remote inspection vehicle may further comprise a) a plurality of motors, b) a motion control circuit which may comprise a processor which may be electrically engaged with the plurality of motors and a memory for storing instructions, wherein the instructions may be adapted to cause the motion control circuit to move the motors, and c) a movement transceiver which may be electrically engaged with the motion control circuit and which may be adapted to interface with a remote transceiver and receive the instructions.

DETAILED DESCRIPTION OF THE INVENTION

Figure 1:
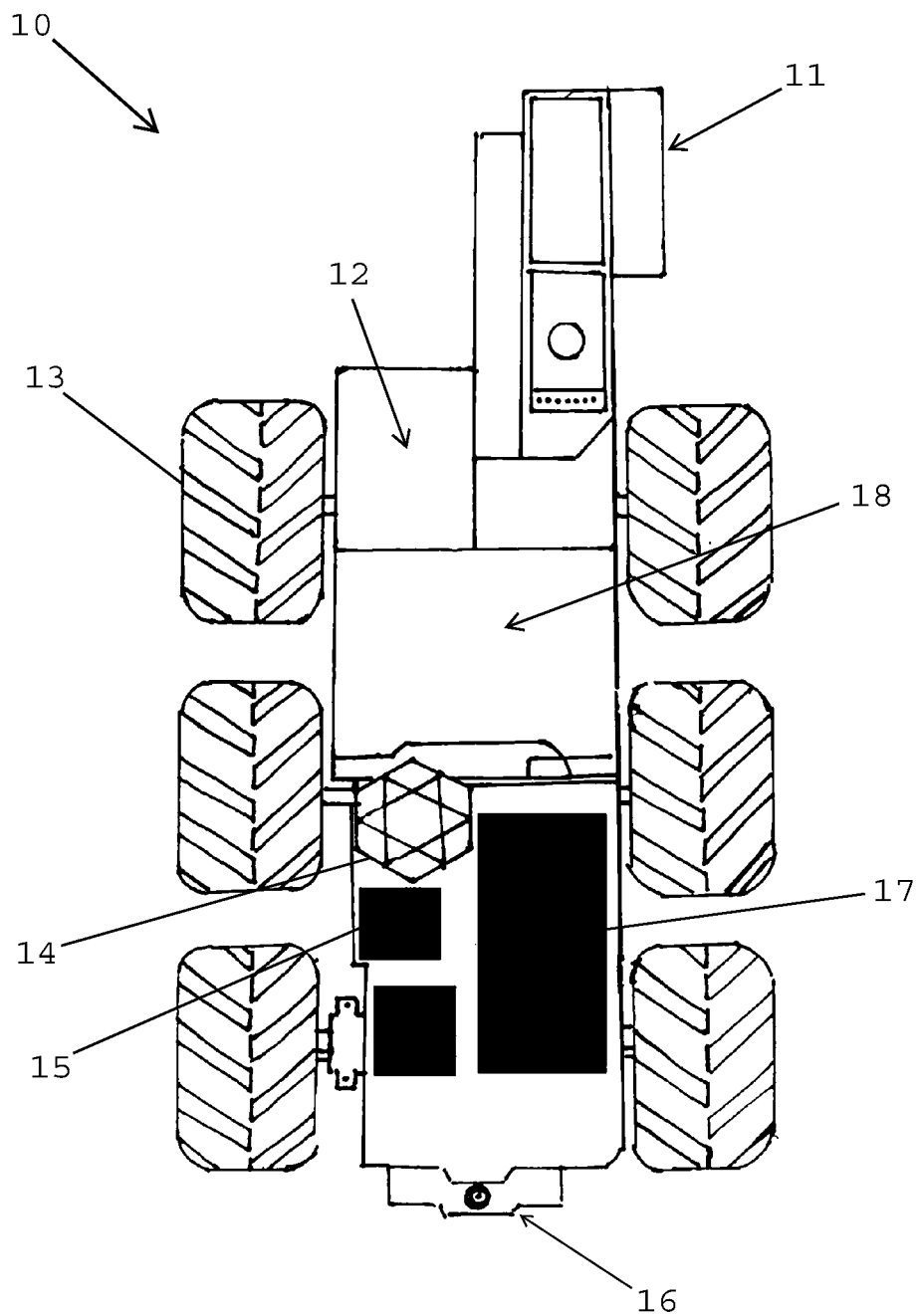
FIG. 1 is a top view diagram illustrating an exemplary remote inspection vehicle for inspecting plants, in accordance with some embodiments of the present invention.
Figure 2:
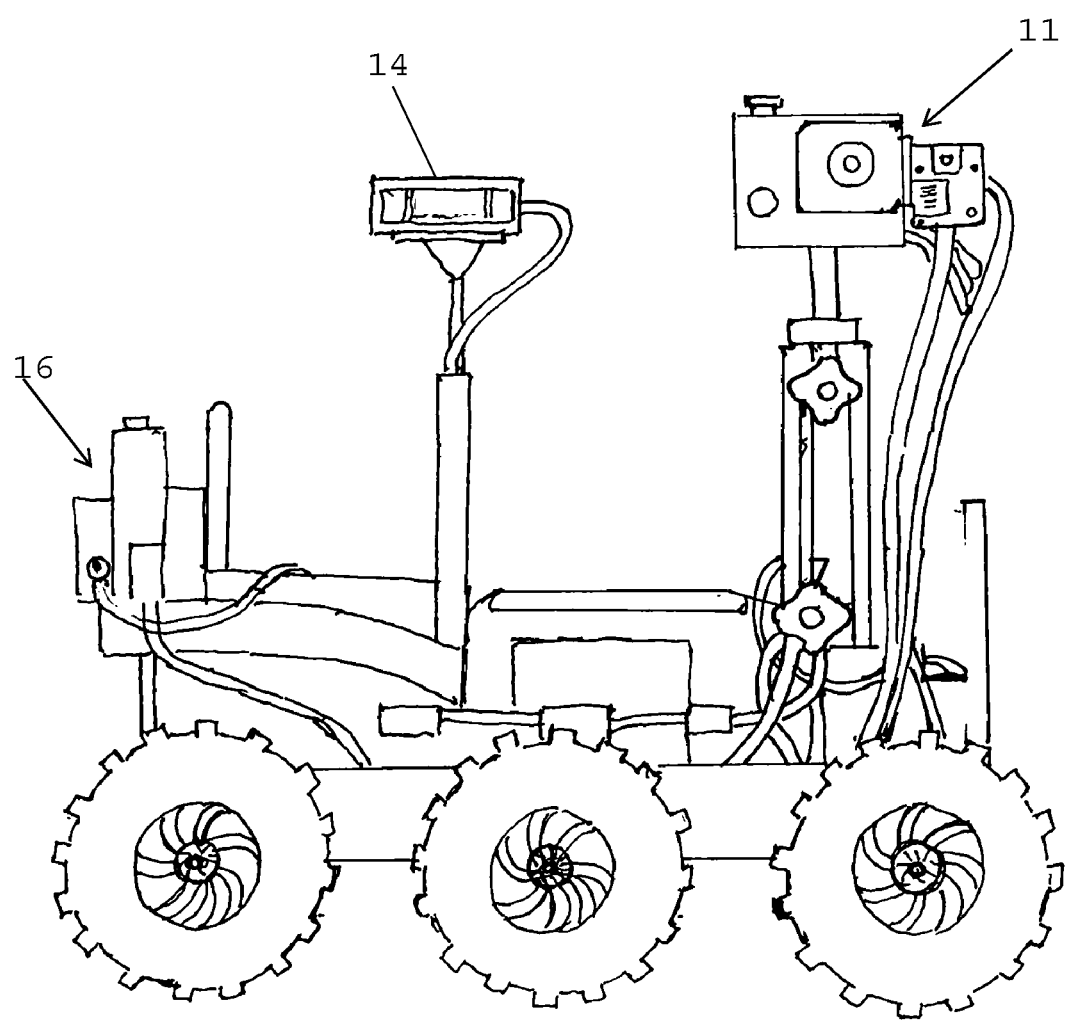
FIG. 2 is a side view diagram illustrating the vehicle of FIG. 1, in accordance with some embodiments of the present invention.
Figure 3:
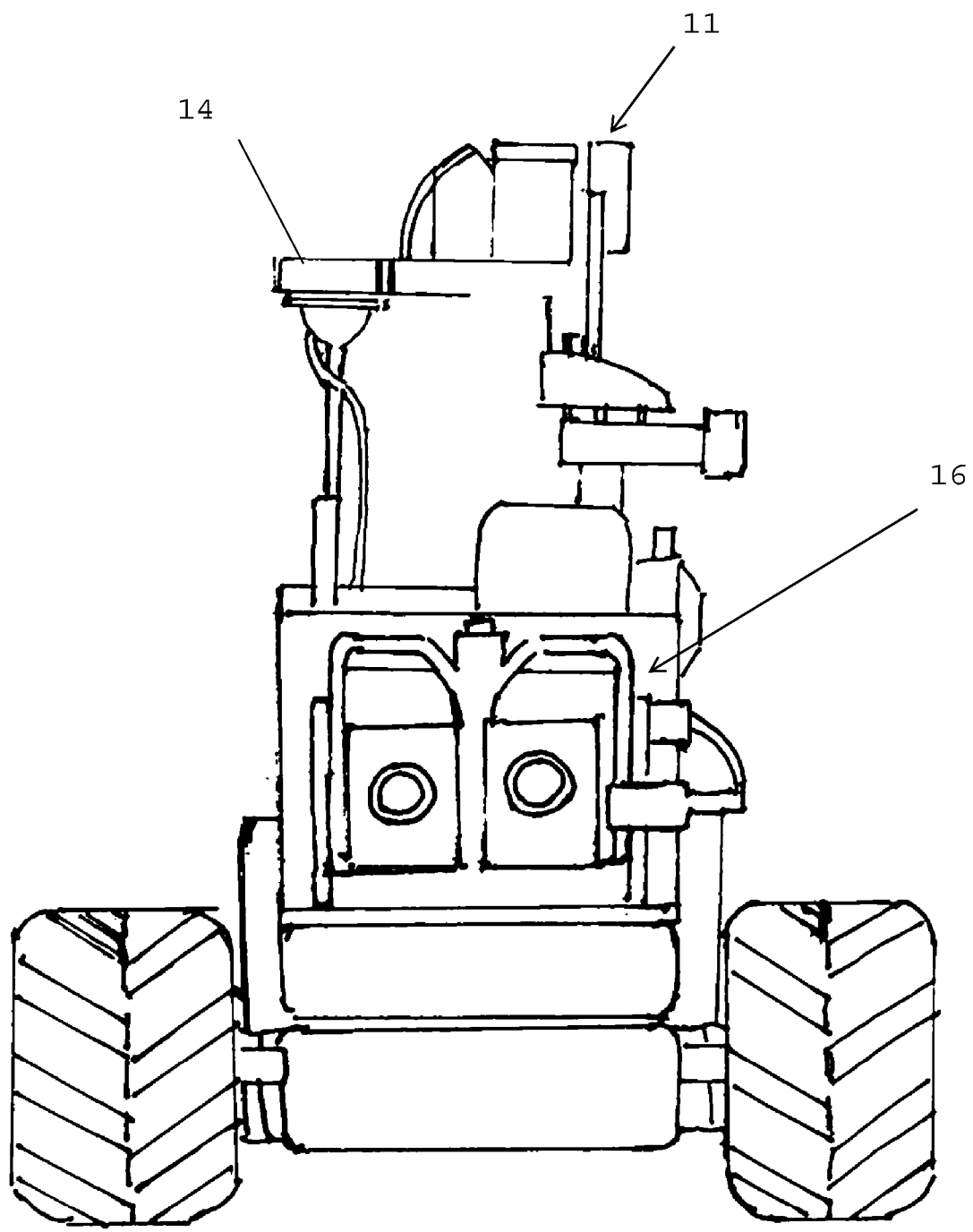
FIG. 3 is a front (rear) view diagram illustrating the vehicle of FIG. 1, in accordance with some embodiments of the present invention.

Referring, generally, to FIGS. 1-3, and according to some embodiments of the present invention, a remote inspection vehicle 10 may comprise a plurality of wheels 13 engaged with a chassis and driven by a plurality of motors (not illustrated). In preferred embodiments, each wheel may have a corresponding electronic motor, with the wheels engaged to the shafts of the motors. As illustrated in FIG. 1, for example, remote inspection vehicle 10 may comprise a battery 12 for powering the electrical components of the vehicle.

According to some embodiments of the present invention, a remote inspection vehicle may be equipped with one or more cameras. For example, as further illustrated in FIGS. 1-3, remote inspection vehicle 10 may comprise an inspection camera 11 for inspecting plants and capturing images thereof. According to some embodiments, an inspection camera may comprise one or more radiometric and/or light sensors. For example, inspection camera 11 may comprise a radiometric infrared (IR) sensor (not illustrated) and a red, green, and blue (RGB) light sensor (not illustrated). In some embodiments, an IR sensor may have a 57-degree field of view and a resolution of 160×120 radiometric pixels. As also illustrated in FIGS. 1-3, remote inspection vehicle 10 may comprise a movement camera 16 for capturing images of a path of remote inspection vehicle 10 which may assist with terrain navigation and steering. Movement camera 16 may comprise, according to some embodiments, a radiometric infrared (IR) sensor (not illustrated) and an RGB sensor (not illustrated).

According to some embodiments of the present invention, a remote inspection vehicle may comprise a controller for moving the vehicle in a forward, rearward, left, or right motion. For example, remote inspection vehicle 10 may comprise a movement controller 17 (which, in some embodiments, may be a flight controller) for controlling the motion of the vehicle. In some aspects, motion controller 17 may autonomously control the movement of remote inspection vehicle 10 (e.g., according to preprogrammed instructions), or it may control the movement of remote inspection vehicle 10 in response to a remotely operated controller (e.g., by a user operating a remote controller).

According to some embodiments, a remote inspection vehicle may be equipped with a GPS receiver. For example, remote inspection vehicle 10 may be equipped with a GPS receiver 14 which may, in some aspects, be operatively connected with motion controller 17. In some embodiments of the present invention, a remote inspection vehicle may be equipped with a computer which may be operatively connected to one or more components of the vehicle. For example, remote inspection vehicle 10 may comprise a computer 18 which may be operatively connected with inspection camera 11, movement camera 16, and/or movement controller 17. Remote inspection vehicle 10 may also, according to some embodiments, have at least one data transceiver 15 which may, in some implementations, be operatively connected with inspection camera 11, movement camera 16, flight controller 17, microcomputer 18, and/or a remote device (e.g., a computer).

Figure 4:
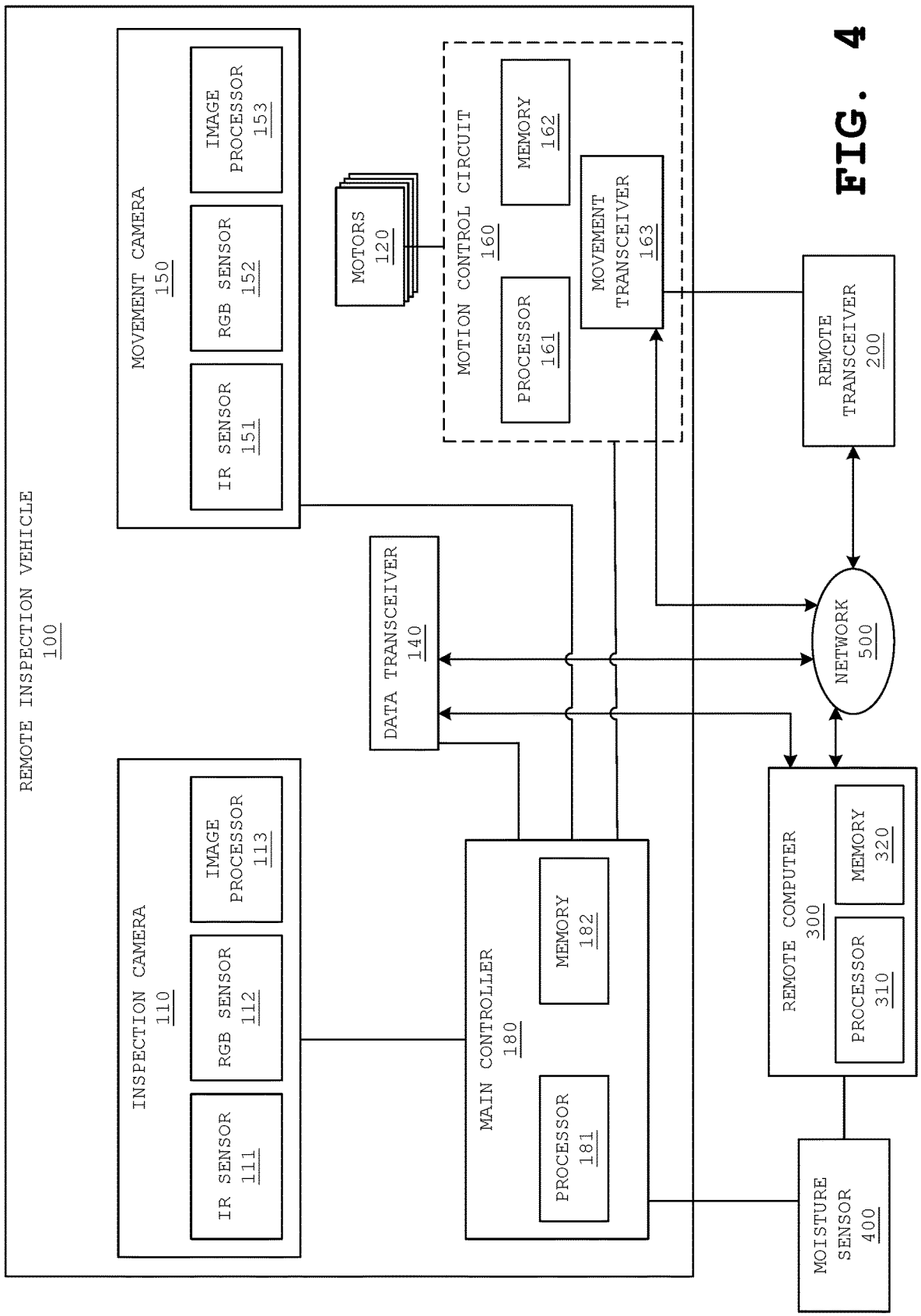
FIG. 4 is a schematic diagram illustrating an exemplary system for controlling a remote inspection vehicle and for capturing, processing, and transmitting plant data, in accordance with some embodiments of the present invention.

Referring now, generally, to FIG. 4, an exemplary remote inspection vehicle 100, in accordance with some embodiments of the present invention, is described schematically and as part of a system of electrical components for controlling the remote inspection vehicle and for capturing, processing, and transmitting image data. Remote inspection vehicle 100 may comprise an inspection camera 110 having a radiometric IR sensor 111, an RGB light sensor 112, and an image processor 113. Inspection camera 110 may be configured to capture images, via IR sensor 111 and RGB sensor 112, and process the images via image processor 113 to generate a plurality of image files. According to some embodiments, the image files generated by inspection camera 110 may be transmitted to one or more remote or on-board processors for further processing.

In accordance with some embodiments of the present invention, and as further illustrated in FIG. 4, remote inspection vehicle 100 may further comprise a movement camera 150 having an IR sensor 151, an RGB light sensor, 152, and an image processor 153. Movement camera 150 may be configured to capture images, via IR sensor 151 and RGB sensor 152, and process the images via image processor 153 to generate a plurality of image files. According to some embodiments, the image files generated by movement camera 150 may be transmitted to one or more remote or on-board processors for further processing.

In accordance with some embodiments of the present invention, and as further illustrated in FIG. 4, remote inspection vehicle 100 may further comprise a motion control circuit 160 which may be electrically connected to a plurality of electronic motors 120 for driving remote inspection vehicle 100. Motion control circuit 160 may comprise a processor 161, a memory 162, and a movement transceiver 163. According to some embodiments, memory 162 may be adapted to receive and store movement instructions. For example, memory 162 may transmit movement instructions to processor 161 which may process the movement instructions and cause motion control circuit 160 to move motors 120 according to the movement instructions. In some embodiments, and as further illustrated in FIG. 4, movement transceiver 163 may be operatively connected to a remote transceiver 200 (e.g., a remote controller) from which movement transceiver 163 may receive movement instructions.

In accordance with some embodiments of the present invention, and as further illustrated in FIG. 4, remote inspection vehicle 100 may further comprise a main controller 180 which may be electrically engaged with inspection camera 110, movement camera 150, motion control circuit 160, and a data transceiver 140. Main controller 180 may comprise a processor 181 and a memory 182 for storing instructions. For example, and according to some embodiments, memory 182 may store movement instructions to cause motion control circuit 160 to move motors 120 according to the movement instructions. In some embodiments, movement instructions may be generated in response to image files generated by image processor 153 and transmitted to main controller 180. According to some embodiments, processor 181 may be configured to receive and process image files from image processor 113 of inspection camera 110 and image processor 153 of movement camera 150.

In accordance with some embodiments of the present invention, and as further illustrated in FIG. 4, data transceiver 140 may be electrically connected to main controller 180 and may be configured to transmit data thereto, and receive data therefrom. In some embodiments, a data transceiver may be configured to transmit and receive data to and from a remote memory. For example, as illustrated in FIG. 4, data transceiver 140 may be operatively connected to a remote computer 300 having a processor 310 and a memory 320 which may be configured to process image file data from inspection camera 110 and/or movement camera 150. In some embodiments, remote computer 300 may be used to view image data received and processed by inspection camera 110 and/or movement camera 150. For example, remote computer 300 may be used to monitor the movement of remote inspection vehicle 100 by enabling a user to view real-time images from movement camera 150. In addition, as another example, remote computer 300 may be used to visually inspect a plant by enabling a user to view real-time images from inspection camera 110.

According to some embodiments of the present invention, one or more electrical components of a remote inspection vehicle may be operatively connected with a network which may be, for example, a cellular, Wi-Fi, or Bluetooth network. For example, as further illustrated in FIG. 4, data transceiver 140 and movement transceiver 163 may be operatively connected with a network 500. Remote computer 300 and remote transceiver 200 may also be operatively connected with network 500 which may allow each of remote computer 300 and remote transceiver 200 to communicate with remote inspection vehicle 100 in any location, as long as a connection with network 500 is established. For example, a user may be able to remotely operate vehicle 100 using a wireless remote having remote transceiver 200, with both movement transceiver 163 and remote transceiver 200 being operatively connected with network 500. Similarly, remote computer 300 may be configured to exchange data with remote inspection vehicle 100 via network 500 by means of an operative connection therewith by data transceiver 140 and remote computer 300.

In some embodiments, an environmental sensor, which may be a soil moisture meter, a thermometer, and/or hygrometer, may interface with a remote computer and/or inspection vehicle. For example, and as further illustrated in FIG. 4, an environmental sensor 400 may be operatively connected to remote computer 300 and main controller 180 of inspection vehicle 100. Environmental sensor 400 may be configured to take measurements, such as soil moisture, and transmit measurement data to remote computer 300 or main controller 180 for processing.

According to some implementations of the present invention, an inspection vehicle may be used to capture and process images of a plant. In some embodiments, an inspection vehicle may be remotely operated by a wireless remote (e.g., remote transceiver 200). In such embodiments, a user may manually control the inspection vehicle, providing real-time commands thereto. It is to be appreciated that a user may use an inspection vehicle to capture and process image data, or an inspection vehicle may be used to visually inspect a plant in real-time. In some embodiments, an inspection vehicle may be autonomously controlled according to preprogrammed instructions (which may be stored, for example, in memory 162 of motion control circuit 160) and according to feedback from a plurality of images captured by a movement camera (e.g., movement camera 150). In such embodiments, an inspection vehicle may move along a predetermined path which may be based on, for example, an orchard layout, inspecting plants therealong. It is to be appreciated that an inspection vehicle may be preprogrammed to process and transmit data to a remote computer (e.g., remote computer 300) and/or it may be preprogrammed to process and store data internally (e.g., via main controller 180).

In preferred implementations, an inspection vehicle may be positioned near a plant to be inspected and oriented such a portion of the plant canopy is within the field of view of an inspection camera. Once positioned, the inspection camera may capture one or more images of the plant canopy and extract image data therefrom. For example, a radiometric IR sensor may be used to measure the thermal temperature of a plant canopy and an RGB light sensor may be used to measure the amount of light reflectance of the plant canopy. Following, the image data may be transmitted to a processor (e.g., processor 181 of main controller 180 or processor 310 of remote computer 300) for further processing. In some implementations, an environmental sensor may be used to measure environmental conditions, preferably at the time that a plant is inspected by an inspection vehicle. For example, a soil moisture sensor may be used to measure the moisture of the soil that a plant under inspection is planted in. Other variables such as ambient temperature or relative humidity may also be measured.

According to some embodiments of the present invention, images of a plant canopy captured by an inspection camera may be analyzed to extract data therefrom. For example, an infrared image of a plant canopy may be analyzed by a software program, such as, but not limited to, ImageJ2 Fiji, to extract a temperature value (in preferred embodiments, in centiKelvin) for each pixel of the infrared image. An average temperature of the plant canopy may be obtained by averaging the temperature values of all pixels within the infrared image. In some embodiments, a temperature value may be used to calculate a CWSI score which may be used in the training of a neural network model (discussed hereinafter). According to some embodiments, an RGB image may be analyzed by a software program, such as, but not limited to, ImageJ2 Fiji, to extract red, green, and blue raster values for each pixel of the RGB image. In preferred embodiments, an infrared image and an RGB image may have at least 19,200 pixels (e.g., a resolution of 160×120 pixels). Also, and according to preferred embodiments, at least 230,400 canopy temperature values and at least 230,400 raster values for each color may be obtained and used in the training of a neural network model.

In accordance with some embodiments of the present invention, a neural network model may be developed to calculate a score which may indicate a probability of early drought stress present in a plant. In preferred embodiments, the neural network model may have a plurality of neural network layers for optimizing and weighting input variables. The input variables, according to some embodiments, may comprise canopy temperatures, red, green, and blue raster values, soil moisture, and calculated CWSI scores. In some embodiments, the model may utilize an optimizer, such as, but not limited to, the Adam optimizer. To train the model, an array of data may be collected from a plant and input into the model.

Figure 5:
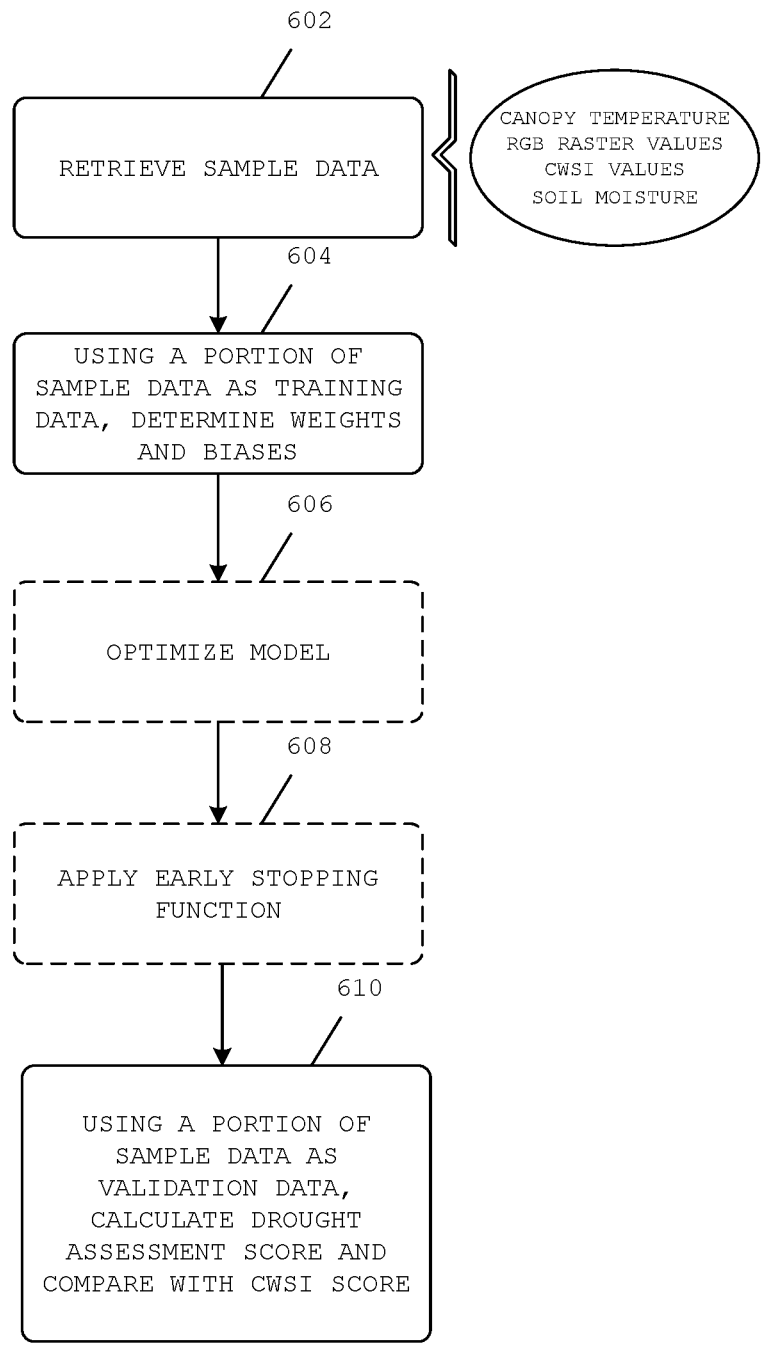
FIG. 5 is a flowchart illustrating an exemplary process for training and validating a neural network model, in accordance with some embodiments of the present invention.

Before the model may be used to calculate a score, it may be trained and validated. For example, according to some implementations, and with reference to FIG. 5, first, sample data may be collected for a plant (Step 602). In preferred embodiments, the sample data may comprise an array of plant canopy temperature values, red, green, and blue raster values, calculated CWSI values, and, optionally, plant soil moisture values (which may be obtained by the means described heretofore (e.g., a remote inspection vehicle equipped with an inspection camera)). Following, using a portion of the sample data (preferably about 80%), a plurality of weights and biases may be derived using, preferably, three neural network layers (Step 604). Optionally, the model may be optimized with a loss function of mean squared error, and metrics of mean squared error and mean absolute error (Step 606). Optionally, an early stopping function may be applied to the model to prevent overfitting (Step 608).

According to some implementations, once the model has been trained, it may be validated against the remaining portion of the sample data (preferably about 20% of the sample data) (Step 610). For example, this sample data may be input into the trained model to calculate a score which can be compared to the previously calculated CWSI score for each sample data point. Once the model is validated, it may be used to calculate a score based on a new data set collected from a plant.

Figure 6:
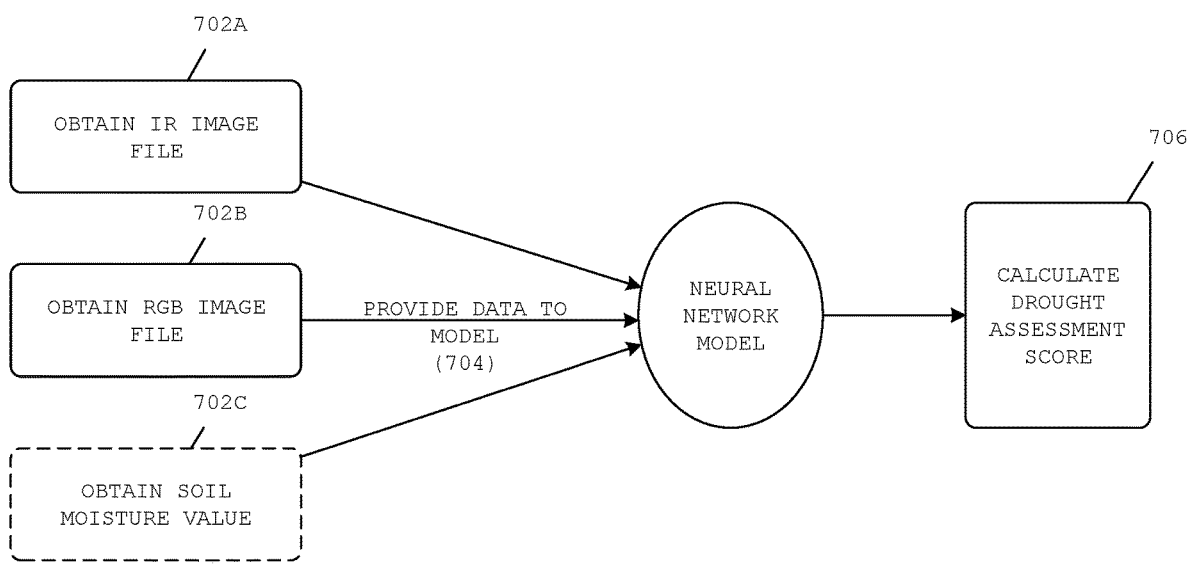
FIG. 6 is a flowchart illustrating an exemplary process for determining a drought assessment score based on image and moisture data, and using a neural network model, in accordance with some embodiments of the present invention.

Referring now, for example, to FIG. 6, a drought assessment score may be calculated for a plant by the trained model according to the illustrated steps. First, a radiometric infrared image file and red, green, and blue light reflectance image files of the plant may be obtained (Steps 702A and B), as well as, optionally, a soil moisture value of the plant (Step 702C). Next, the radiometric infrared image file, the red, green, and blue light reflectance image files, and, optionally, the soil moisture value, may be provided to the trained model (Step 704). Lastly, using the data provided, the trained model may calculate a drought stress assessment score of the plant (Step 706). In some implementations, a prediction output program may be integrated with the neural network model to output a drought stress assessment score. It is to be appreciated that, according to some implementations, an image file may comprise an array of data or an average value of a data array. For example, if an array of data is provided to the trained model, the model may calculate a drought stress assessment score for each data point. However, if an average value of a data array is provided to the trained model, for example, the model may calculate a single (i.e., average) drought stress assessment score.

In practical applications, the remote inspection vehicle and the neural network model may be used collectively to assess crop health and determine when to irrigate crops. It is to be appreciated that the present invention can be adapted and modified to streamline crop assessment and watering practices. For instance, the remote inspection vehicle could be adapted to interface directly with irrigation systems which may allow the inspection vehicle to adjust (either autonomously or by input from an operator) watering amounts and/or schedules. In some cases, the remote inspection vehicle may operate completely autonomously—monitoring crop health by calculating drought assessment scores and making real-time water application adjustments based on the calculated scores.

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention.

Moreover in this document, relational terms, such as second, top and bottom, and the like may be used solely to distinguish one entity or action from another entity or action without necessarily requiring or implying any actual such relationship or order between such entities or actions. The terms "comprises", "comprising", "has", "having," "includes", "including", "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional elements of the same type in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" or "connected" as used herein may not necessarily indicate a direct connection or not necessarily mechanical connection. Methods or processes disclosed herein may be embodied in hardware and/or software. Similarly, the term "processor" may refer to hardware and/or software. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A method for determining the probability of early drought stress in a plant comprising the steps of:
   a) creating a neural network model having at least three layers;
   b) obtaining a radiometric infrared image file of said plant;
   c) obtaining each of a red, green, and blue light reflectance image file of said plant;
   d) providing each of said radiometric infrared image file, said red light reflectance image file, said green light reflectance image file, and said blue light reflectance image file to said model; and
   e) generating a score associated with said plant;
   wherein said step of creating said model comprises creating a training database, said training database consisting of a plurality of databases of samples, each of said samples comprising a temperature value, a red raster value, a green raster value, a blue raster value, a moisture value, and a calculated CWSI value.

2. The method of claim 1, wherein said temperature value is extracted from a radiometric infrared image.

3. The method of claim 1, wherein each of said red raster value, said green raster value, and said blue raster value are extracted from a light reflectance image.

4. The method of claim 1, wherein said CWSI value is calculated by taking an average of a plurality of said temperature value.

5. The method of claim 1, further comprising the step of:
   f) determining a plurality of weights and biases of the neural network model by using about eighty percent (80%) of said samples in said database.

6. The method of claim 1, further comprising the step of:
f) optimizing the model with a loss function of mean squared error, and metrics of mean squared error and mean absolute error.

7. The method of claim 1 further comprising the step of:
f) applying an early stopping function to prevent overfitting.

8. The method of claim 1, further comprising the steps of:
f) obtaining a soil moisture value associated with said plant; and
g) providing said soil moisture value to said model.

9. A system for determining early drought stress in a plant, comprising:
a) a processor and a memory, said memory comprising instructions adapted to generate a drought assessment score associated with said plant from a radiometric infrared image and a red, green, and blue light reflectance image of said plant; and
b) a remote inspection vehicle for obtaining said images of said plant, said remote inspection vehicle comprising a (1) data transceiver and (2) an inspection camera, said inspection camera comprising a first image processor engaged with a radiometric infrared sensor and a color light sensor, and configured to generate said images therefrom,
wherein said instructions comprise a neural network model having at least three layers, and is trained and optimized using a database of samples, each said sample comprising a temperature value, a red raster value, a green raster value, a blue raster value, a moisture value, and a calculated CWSI value.

10. The system of claim 9, said remote inspection vehicle further comprising:
(3) a plurality of motors;
(4) a motion control circuit comprising a processor electrically engaged with said plurality of motors and a memory for storing instructions, said instructions adapted to cause said motion control circuit to move said motors; and
(5) a movement transceiver electrically engaged with said motion control circuit and adapted to interface with a remote transceiver and receive said instructions.

11. The system of claim 10, wherein said motion control circuit comprises a position determining circuit.

12. The system of claim 10, wherein said remote inspection vehicle further comprises:
(6) a main controller, said main controller comprising a processor and a memory for storing instructions, said main controller electrically engaged to said motion control circuit, said data transceiver, said inspection camera, and said movement transceiver.

13. The system of claim 12, wherein said instructions are adapted to cause said motion control circuit to move said motors.

14. The system of claim 12, wherein said instructions are adapted to cause said controller to receive and process said images.

15. The system of claim 12, wherein said instructions are adapted to cause said controller to transmit said images to a remote memory through said data transceiver.

16. The system of claim 9, wherein said temperature value is extracted from a radiometric infrared image generated from said radiometric infrared sensor.

17. The system of claim 9, wherein each of said red raster value, said green raster value, and said blue raster value are extracted from a light reflectance image generated from said color light sensor.

18. The system of claim 17, wherein said color light sensor comprises an RGB sensor with an infrared filter.

19. The system of claim 9, wherein said model is further trained and optimized with a soil moisture value associated with said plant.

* * * * *